(12) United States Patent
Chou et al.

(10) Patent No.: US 8,546,031 B2
(45) Date of Patent: Oct. 1, 2013

(54) HYDROGEN GENERATION DEVICE AND FUEL CELL USING THE SAME

(75) Inventors: Po-Kuei Chou, Hsinchu County (TW); Cheng Wang, Hsinchu County (TW); Yueh-Chang Wu, Hsinchu County (TW)

(73) Assignee: Young Green Energy Co., Hsinchu County (TW)

( * ) Notice: Subject to any disclaimer, the term of this patent is extended or adjusted under 35 U.S.C. 154(b) by 324 days.

(21) Appl. No.: 12/908,002

(22) Filed: Oct. 20, 2010

(65) Prior Publication Data

US 2011/0189563 A1 Aug. 4, 2011

(30) Foreign Application Priority Data

Feb. 1, 2010 (CN) .......................... 2010 1 0108959

(51) Int. Cl.
*H01M 8/06* (2006.01)
*B01J 8/08* (2006.01)

(52) U.S. Cl.
USPC .......................................... 429/423; 422/209

(58) Field of Classification Search
USPC .......................................... 429/423; 422/209
See application file for complete search history.

(56) References Cited

U.S. PATENT DOCUMENTS

2004/0047801 A1* 3/2004 Petillo et al. .................. 423/657

* cited by examiner

*Primary Examiner* — Karie O'Neill Apicella
(74) *Attorney, Agent, or Firm* — Jianq Chyun IP Office

(57) ABSTRACT

A hydrogen generation device and a fuel cell using the same are provided. The hydrogen generation device includes a first containing groove, a cover, a second containing groove, and a rotating device. The first containing groove contains liquid water. The cover is fixed on the first containing groove and covers the liquid water. The cover has an opening for exposing the liquid water. The second containing groove is stacked on the cover and divided into a plurality of containing compartments, wherein each containing compartment contains a solid fuel. The opening is aligned with one containing compartment so that the corresponding solid fuel reacts with the liquid water generate hydrogen. The rotating device is connected with the first or the second containing groove. The opening is moved and aligned with another containing compartment when the rotating device drives the first containing groove and the second containing groove to relatively rotate.

6 Claims, 2 Drawing Sheets

HYDROGEN GENERATION DEVICE AND FUEL CELL USING THE SAME

CROSS-REFERENCE TO RELATED APPLICATION

This application claims the priority benefit of China application serial no. 201010108959.9, filed on Feb. 1, 2010. The entirety of the above-mentioned patent application is hereby incorporated by reference herein and made a part of this specification.

BACKGROUND OF THE INVENTION

1. Field of the Invention

The invention generally relates to a hydrogen generation device and a fuel cell (FC) having the hydrogen generation device, and more particularly, to a hydrogen generation device using a solid fuel and a FC having the hydrogen generation device.

2. Description of Related Art

A fuel cell (FC) is an electricity generation apparatus that directly converts chemical energy into electrical energy. Compared to the conventional electricity generation techniques, the FC offers lower pollution, lower noise, higher energy density, and higher energy conversion efficiency and therefore it is a very promising clean energy source. FCs could be applied in portable electronic products, home electricity generation systems, transportation vehicles, military equipments, the space industry, and small-scale electricity generation systems, etc.

Different FCs have different applications according to the operating principles and operating environments. Proton exchange membrane fuel cells (PEMFCs) and direct methanol fuel cells (DMFCs) are mostly applied to portable power sources. Both PEMFC and DMFC are low temperature FCs using proton exchange membranes for conducting protons. According to the operating principle, oxidation of hydrogen is carried out in the anode catalyst layer to produce hydrogen ions $H^+$ and electrons $e^-$ (the operating principle of PEMFC) or water oxidation of methanol is carried out in the anode catalyst layer to produce hydrogen ions $H^+$, carbon dioxide ($CO_2$), and electrons $e^-$ (the operating principle of DMFC), wherein the hydrogen ions $H^+$ are conducted by the proton exchange membrane to the cathode, while the electrons $e^-$ are first transmitted to the load through an external circuit before they are conducted to the cathode. Herein a redox reaction between the oxygen supplied to the cathode and the hydrogen ions $H^+$ and electrons $e^-$ is carried out in the cathode catalyst layer and water is produced. The hydrogen supplied to the anode could be obtained through a solid $NaBH_4$ hydrogen storage technique, wherein water reacts with solid $NaBH_4$ to form hydrogen.

The reaction between solid $NaBH_4$ and water is a one-off reaction, and once the reaction starts, it won't stop until the solid $NaBH_4$ or water completely runs out. Thereby, the problem of how to carry out the reaction in multiple stages has to be resolved.

SUMMARY OF THE INVENTION

Accordingly, the invention is directed to a hydrogen generation device, wherein the reaction between a solid fuel and water is carried out in multiple stages.

The invention is directed to a fuel cell (FC), wherein the reaction between a solid fuel and water of a hydrogen generation device of the FC is carried out in multiple stages.

According to an embodiment of the invention, a hydrogen generation device adaptable to a FC is provided. The hydrogen generation device includes a first containing groove, a cover, a second containing groove, and a rotating device. The first containing groove contains a liquid water. The cover is fixed on the first containing groove and covers the liquid water, wherein the cover has an opening for exposing the liquid water. The second containing groove is stacked on the cover and divided into a plurality of containing compartments, wherein each of the containing compartments contains a solid fuel. The opening is aligned with one of the containing compartments so that the corresponding solid fuel reacts with the liquid water to form hydrogen. The rotating device is connected to one of the first containing groove and the second containing groove. The opening is moved and aligned with another one of the containing compartments when the rotating device drives the first containing groove and the second containing groove to rotate relatively.

According to an embodiment of the invention, a FC including a hydrogen generation device, a FC stack, and a guiding structure is provided. The hydrogen generation device includes a first containing groove, a cover, a second containing groove, and a rotating device. The first containing groove contains a liquid water. The cover is fixed on the first containing groove and covers the liquid water, wherein the cover has an opening for exposing the liquid water. The second containing groove is stacked on the cover and divided into a plurality of containing compartments, wherein each of the containing compartments contains a solid fuel. The opening is aligned with one of the containing compartments so that the corresponding solid fuel reacts with the liquid water to form hydrogen. The rotating device is connected to one of the first containing groove and the second containing groove. The opening is moved and aligned with another one of the containing compartments when the rotating device drives the first containing groove and the second containing groove to rotate relatively. The guiding structure is connected between the hydrogen generation device and the FC stack for guiding the hydrogen formed by the reaction between the solid fuels and the liquid water to the FC stack.

As described above, an embodiment of the invention has at least one of following advantages. The first containing groove and the second containing groove are driven by the rotating device to rotate relatively, so that the cover fixed on the first containing groove is moved relative to the second containing groove and the liquid water exposed by the opening on the cover is aligned with the solid fuel in different containing compartment of the second containing groove. Thus, the liquid water sequentially reacts with the solid fuels to form hydrogen, so that a stage reaction effect is achieved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
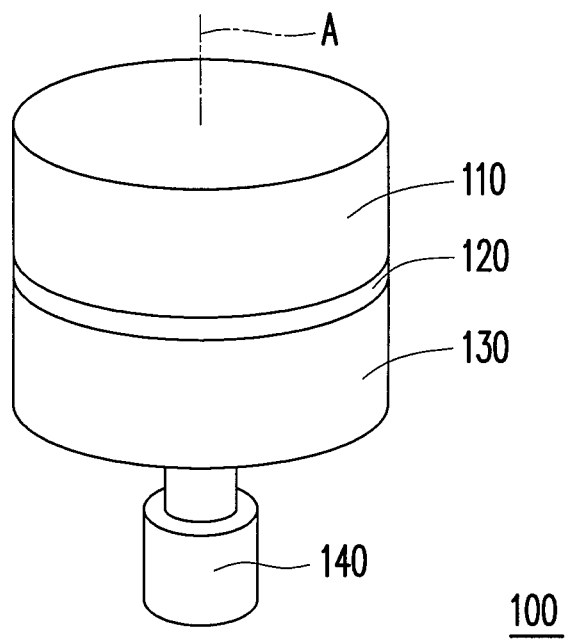
FIG. 1 is a diagram of a hydrogen generation device according to an embodiment of the invention.
Figure 2:
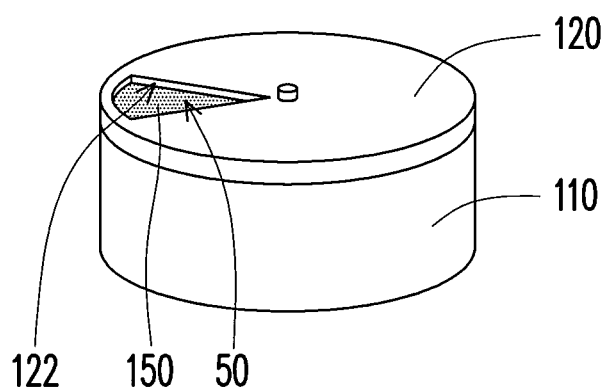
FIG. 2 is a diagram of a first containing groove and a cover in FIG. 1.
Figure 3:
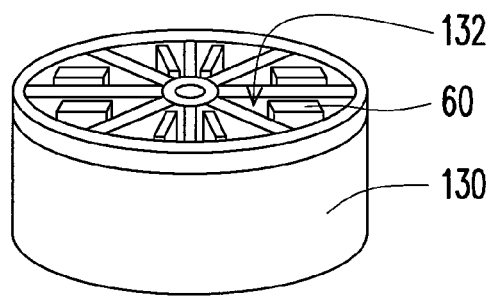
FIG. 3 is a diagram of a second containing groove in FIG. 1.

FIG. 1 is a diagram of a hydrogen generation device according to an embodiment of the invention. FIG. 2 is a diagram of a first containing groove and a cover in FIG. 1. FIG. 3 is a diagram of a second containing groove in FIG. 1. Referring to FIGS. 1-3, the hydrogen generation device 100 in the embodiment is adapted to a fuel cell (FC) for supplying hydrogen to the anode reaction of the FC. The hydrogen generation device 100 includes a first containing groove 110, a cover 120, a second containing groove 130, and a rotating device 140.

The first containing groove 110 contains a liquid water 50 (as shown in FIG. 2). The cover 120 is fixed on the first containing groove 110 and covers the liquid water 50. The cover 120 has an opening 122 for exposing the liquid water 50. To be specific, the opening 122 exposes a part of the liquid water 50. The second containing groove 130 is stacked on the cover 120. The second containing groove 130 is divided into a plurality of containing compartments 132. Each of the containing compartments 132 contains a solid fuel 60. The rotating device 140 is connected to the second containing groove 130 and drives the second containing groove 130 to rotate relative to the first containing groove 110.

With the disposition illustrated in FIG. 1, the opening 122 in FIG. 2 is aligned with one of the containing compartments 132 in FIG. 3, so that the corresponding solid fuel 60 reacts with the liquid water 50 to form hydrogen. After a solid fuel 60 completely reacts with the liquid water 50, a user could rotate the second containing groove 130 relative to the first containing groove 110 through the rotating device 140, so as to align the opening 122 with another one of the containing compartments 132 and such that the liquid water 50 reacts with another solid fuel 60.

Through the technique described above, the liquid water 50 in the first containing groove 110 sequentially reacts with the solid fuels 60 so that a staged reaction effect is achieved. In the embodiment, the rotating device 140 is a stepper motor, and the stepper motor controls the rotation angle of the second containing groove 130 to allow the opening 122 to be sequentially aligned with the containing compartments 132 through the rotation of the second containing groove 130.

It should be noted that in another embodiment, the rotating device 140 may also be connected to the first containing groove 110 and rotates the first containing groove 110 relative to the second containing groove 130. However, the invention is not limited herein. In addition, in the embodiment, the solid fuels 60 may be solid $NaBH_4$. However, the invention is not thereto, and the solid fuels 60 may also be other suitable types of solid fuels.

In the embodiment, the first containing groove 110 and the second containing groove 130 are two disc structures that are stacked together, and the second containing groove 130 is pivoted to the cover 120 along the axis A. However, the invention is not limited thereto, and in another embodiment, the first containing groove 110 and the second containing groove 130 may also be in other suitable shapes, and the second containing groove 130 may not be pivoted to the cover 120. To be specific, the hydrogen generation device 100 in the embodiment may further include a water absorbing structure 150. The water absorbing structure 150 is disposed in the first containing groove 110 for absorbing the liquid water 50 and form a water jel, so as to secure the liquid water 50 in the first containing groove 110 and prevent the liquid water 50 from leaking.

Figure 4:
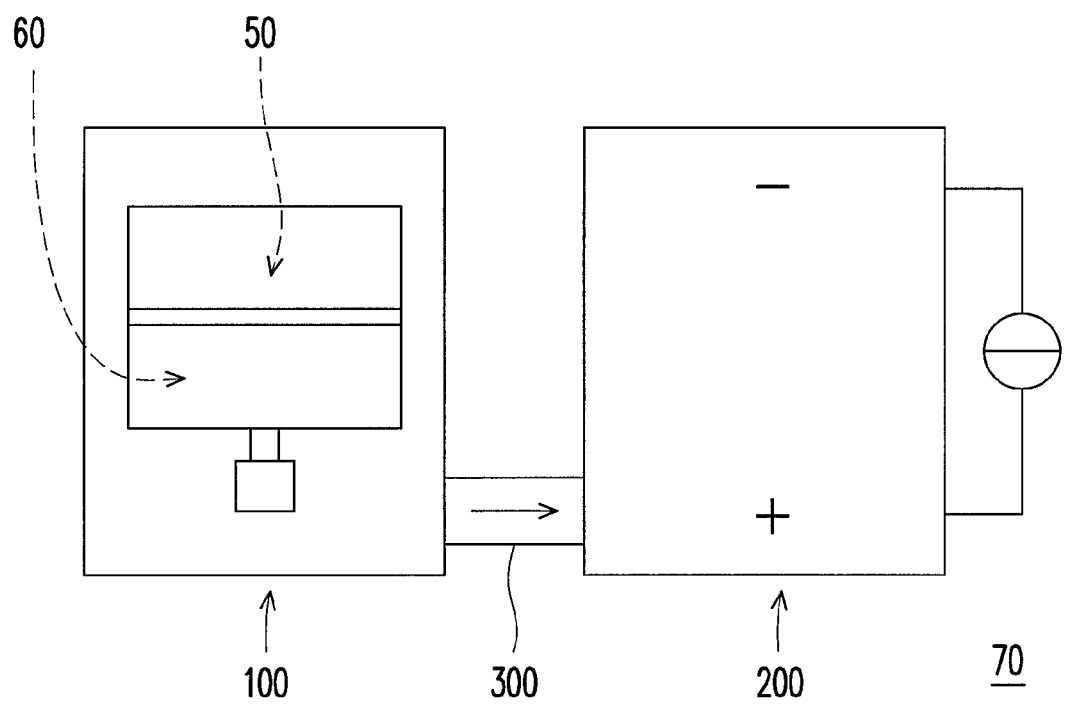
FIG. 4 is a diagram of the hydrogen generation device in FIG. 1 applied in a fuel cell (FC).

The hydrogen generation device 100 described in foregoing embodiment could be applied to a FC for supplying hydrogen required by the anode reaction of the FC, and an application will be described below with reference to FIG. 4. FIG. 4 is a diagram of the hydrogen generation device in FIG. 1 applied in a FC. Referring to FIG. 4, the FC 70 in the embodiment includes the hydrogen generation device 100 illustrated in FIG. 1, a FC stack 200, and a guiding structure 300. The guiding structure 300 is connected between the hydrogen generation device 100 and the FC stack 200, and which guides the hydrogen formed in the reaction between the solid fuels 60 and the liquid water 50 to the FC stack 200 for an anode reaction. It should be noted that the oxygen required by the cathode reaction of the FC stack 200 may be supplied by another supply source, and which is not limited in the embodiment. The FC 70 in the embodiment could be applied to an electronic device (for example, a notebook computer or a cell phone) or a transportation vehicle (for example, a car or a boat).

As described above, an embodiment of the invention has at least one of following advantages. The first containing groove and the second containing groove are driven by the rotating device to rotate relative to each other, so that the cover fixed on the first containing groove is moved relative to the second containing groove and the liquid water exposed by the opening on the cover is aligned with the solid fuel in different containing compartment of the second containing groove. Thus, the liquid water sequentially reacts with the solid fuels to form hydrogen, so that a staged reaction effect is achieved. In addition, the rotating device is a stepper motor, wherein the stepper motor controls the rotation angle of the second containing groove relative to the first containing groove so that the opening is sequentially aligned with the containing compartments through the relative rotation of the second containing groove and the first containing groove.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A hydrogen generation device, adaptable to a fuel cell, the hydrogen generation device comprising:
   a first containing groove, for containing a liquid water;
   a cover, fixed on the first containing groove and covering the liquid water, wherein the cover has an opening for exposing the liquid water;
   a second containing groove, stacked with the first containing groove and coaxially pivoted to the cover along an axis, wherein the second containing groove is divided into a plurality of containing compartments, each of the containing compartments contains a solid fuel, and the opening is aligned with one of the containing compartments so that the corresponding solid fuel reacts with the liquid water to directly form hydrogen in the corresponding containing compartment; and
   a rotating device, connected to one of the first containing groove and the second containing groove, wherein the opening is moved and sequentially aligned with the containing compartments when the rotating device drives the first containing groove and the second containing groove to rotate relatively around the axis.

2. The hydrogen generation device according to claim 1, wherein the rotating device is a stepper motor.

3. The hydrogen generation device according to claim 1 further comprising a water absorbing structure, wherein the water absorbing structure is disposed in the first containing compartment for absorbing the liquid water.

4. A fuel cell, comprising:
   a hydrogen generation device, comprising:
   a first containing groove, for containing a liquid water;
   a cover, fixed on the first containing groove and covering the liquid water, wherein the cover has an opening for exposing the liquid water;
   a second containing groove, stacked with the first containing groove and coaxially pivoted to the cover along an axis, wherein the second containing groove is divided into a plurality of containing compartments, each of the containing compartments contains a solid fuel, and the opening is aligned with one of the containing compartments so that the corresponding solid fuel reacts with the liquid water to directly form hydrogen in the corresponding containing compartment;
   a rotating device, connected to one of the first containing groove and the second containing groove, wherein the opening is moved and sequentially aligned with the containing compartments when the rotating device drives the first containing groove and the second containing groove to rotate relatively around the axis;
   a fuel cell stack; and
   a guiding structure, connected between the hydrogen generation device and the fuel cell stack, for guiding the hydrogen formed in reactions between the solid fuels and the liquid water to the fuel cell stack.

5. The fuel cell according to claim 4, wherein the rotating device is a stepper motor.

6. The fuel cell according to claim 4 further comprising a water absorbing structure, wherein the water absorbing structure is disposed in the first containing compartment for absorbing the liquid water.

* * * * *